(12) United States Patent  (10) Patent No.: US 8,302,467 B2
Tanaka et al.  (45) Date of Patent: Nov. 6, 2012

(54) THROTTLE OPENING DETECTION APPARATUS FOR A SADDLE-TYPE VEHICLE

(75) Inventors: Yuichi Tanaka, Saitama (JP); Kunihiko Fukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 505 days.

(21) Appl. No.: 12/461,504

(22) Filed: Aug. 13, 2009

(65) Prior Publication Data

US 2010/0071450 A1  Mar. 25, 2010

(30) Foreign Application Priority Data

Sep. 19, 2008 (JP) .................................. 2008-241107

(51) Int. Cl.
*G01M 17/00* (2006.01)
(52) U.S. Cl. ..................................................... 73/114.36
(58) Field of Classification Search ............... 73/114.36, 73/114.38
See application file for complete search history.

(56) References Cited

U.S. PATENT DOCUMENTS

| 5,893,295 | A | 4/1999 | Bronnert | |
|---|---|---|---|---|
| 6,832,511 | B2 * | 12/2004 | Samoto et al. | 73/114.36 |
| 6,840,096 | B2 * | 1/2005 | Samoto et al. | 73/114.36 |
| 6,920,805 | B2 * | 7/2005 | Samoto et al. | 74/485 |
| 7,237,452 | B2 * | 7/2007 | Hanai | 74/491 |
| 7,445,071 | B2 * | 11/2008 | Yamazaki et al. | 180/219 |
| 2003/0159529 | A1 * | 8/2003 | Samoto et al. | 73/865.9 |
| 2003/0172763 | A1 * | 9/2003 | Samoto et al. | 74/485 |
| 2004/0255658 | A1 * | 12/2004 | Suzuki | 73/118.1 |
| 2007/0084658 | A1 * | 4/2007 | Yamazaki et al. | 180/219 |
| 2007/0157902 | A1 * | 7/2007 | Possehl et al. | 123/400 |
| 2009/0007716 | A1 * | 1/2009 | Soda et al. | 74/504 |
| 2010/0162848 | A1 * | 7/2010 | Suzuki | 74/504 |
| 2010/0212630 | A1 * | 8/2010 | Nozoe et al. | 123/399 |
| 2010/0307282 | A1 * | 12/2010 | Yaguchi | 74/504 |
| 2011/0132128 | A1 * | 6/2011 | Sato | 74/489 |

FOREIGN PATENT DOCUMENTS

| EP | 1 338 502 A1 | 8/2003 |
|---|---|---|
| JP | 2902490 | 6/1999 |
| JP | 4112876 | 7/2008 |
| JP | 2007-270783 | 10/2008 |
| WO | 00/37305 A1 | 6/2000 |
| WO | 2005/042306 A2 | 5/2005 |
| WO | 2005/108197 A1 | 11/2005 |

* cited by examiner

*Primary Examiner* — Eric S McCall
(74) *Attorney, Agent, or Firm* — Squire Sanders (US) LLP

(57) ABSTRACT

A throttle opening detection apparatus can include a throttle pipe, a throttle sensor, a resisting force application unit, and a cancel switch. The throttle pipe is configured to partly project into a case fixed to a bar handle and is configured to support rotation at an end portion of the bar handle. The throttle sensor is configured to detect a rotating operation amount of a throttle grip, which is mounted against relative rotation on the throttle pipe, in response to the rotation of the throttle pipe. The throttle sensor is disposed at a fixed position in the case. The resisting force application unit is configured to apply a resisting force to the rotating operation of the throttle grip. The resisting force application unit is accommodated in the case. The cancel switch configured to cancel operation of an auto-cruise controlling apparatus. The cancel switch is accommodated in the case together with the throttle sensor and the resisting force application unit.

17 Claims, 8 Drawing Sheets

THROTTLE OPENING DETECTION APPARATUS FOR A SADDLE-TYPE VEHICLE

FIELD

Embodiments of the present invention generally relate to a throttle opening detection apparatus for a saddle-type vehicle and, more particularly, to a throttle opening detection apparatus for detecting a rotating operation amount of a throttle grip.

BACKGROUND

In a throttle opening detection apparatus, when a rider of a motorcycle operates to rotate a throttle grip, an electrically operated throttle valve is operated not by a mechanical movement of a cable connecting to the throttle grip but directly in response to an electric signal from a sensor. This sensor electrically detects an amount of the rotation of the throttle grip. Such an apparatus is generally described in Japanese Patent No. 2,902,490 (hereinafter "Patent Document 1"). In this instance, since distortion, elongation and friction of a cable are not involved, the rotation load of the throttle grip by the rider decreases, and the throttle grip can be operated to rotate by very light operating force. However, a suitable load to adjust the amount of rotation of the throttle grip is preferable.

Japanese Patent No. 4,112,876 (hereinafter "Patent Document 2") generally describes a throttle opening detection apparatus that includes a resisting force application means. The resisting force application means generates a rotation load of a throttle grip by frictional force. The frictional force is generated when a friction plate is pressed against a gear wheel which forms part of a gear mechanism. The gear mechanism is provided between the throttle grip and a throttle sensor and is accommodated in a case together with the throttle sensor.

Japanese Patent Laid-Open No. 2007-270783 generally describes a throttle opening detection apparatus for a saddle-type vehicle such as a motorcycle. The saddle-type vehicle includes an auto-cruise controlling apparatus that automatically keeps a traveling speed at a fixed speed without a throttle operation by a rider. The saddle-type vehicle also includes a cancel switch capable of canceling the operation of the auto-cruise controlling apparatus.

SUMMARY

According to an embodiment of the present invention, a throttle opening detection apparatus is provided for a saddle-type vehicle. The apparatus includes a throttle pipe, a throttle sensor, a resisting force application unit, and a cancel switch. The throttle pipe is configured to partly project into a case fixed to a bar handle and is configured to support rotation at an end portion of the bar handle. The throttle sensor is configured to detect a rotating operation amount of a throttle grip, which is mounted against relative rotation on the throttle pipe, in response to the rotation of the throttle pipe. The throttle sensor is disposed at a fixed position in the case. The resisting force application unit is configured to apply a resisting force to the rotating operation of the throttle grip, and is accommodated in the case. The cancel switch is configured to cancel operation of an auto-cruise controlling apparatus, and is accommodated in the case together with the throttle sensor and the resisting force application unit.

According to another embodiment of the present invention, a throttle opening detection apparatus is for a saddle-type vehicle. The apparatus includes a throttle pipe means for supporting rotation at an end portion of a bar handle and a throttle sensor means for detecting a rotating operation amount of a throttle grip means, in response to a rotation of the throttle pipe means. The apparatus also includes a resisting force application means for applying a resisting force to the rotating operation of the throttle grip and a cancel switch means for cancelling operation of an auto-cruise controlling apparatus.

According to another embodiment of the present invention, a throttle opening detection method is provided for a saddle-type vehicle. The method includes detecting, by a throttle sensor, a rotating operation amount of a throttle grip, in response to a rotation of a throttle pipe. The method also includes applying, by a resisting force application unit, a resisting force to the rotating operation of the throttle grip. The method also includes cancelling, by a cancel switch, an operation of an auto-cruise controlling apparatus.

DESCRIPTION OF THE PREFERRED EMBODIMENTS

Discussed below are described some embodiments of the invention with reference to the accompanying drawings.

Figure 1:
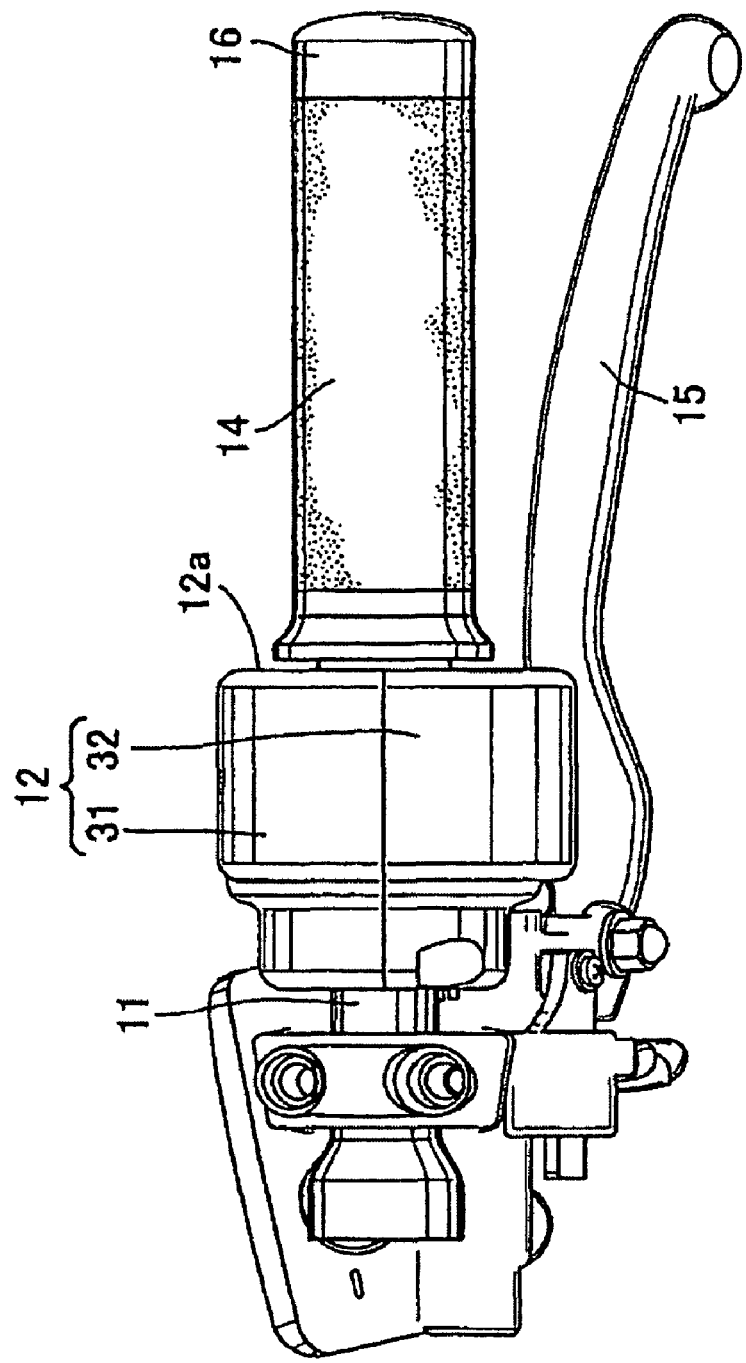
FIG. 1 is a view of a right end portion of a bar handle as viewed from the rear side in accordance with an embodiment of the present invention.
Figure 2:
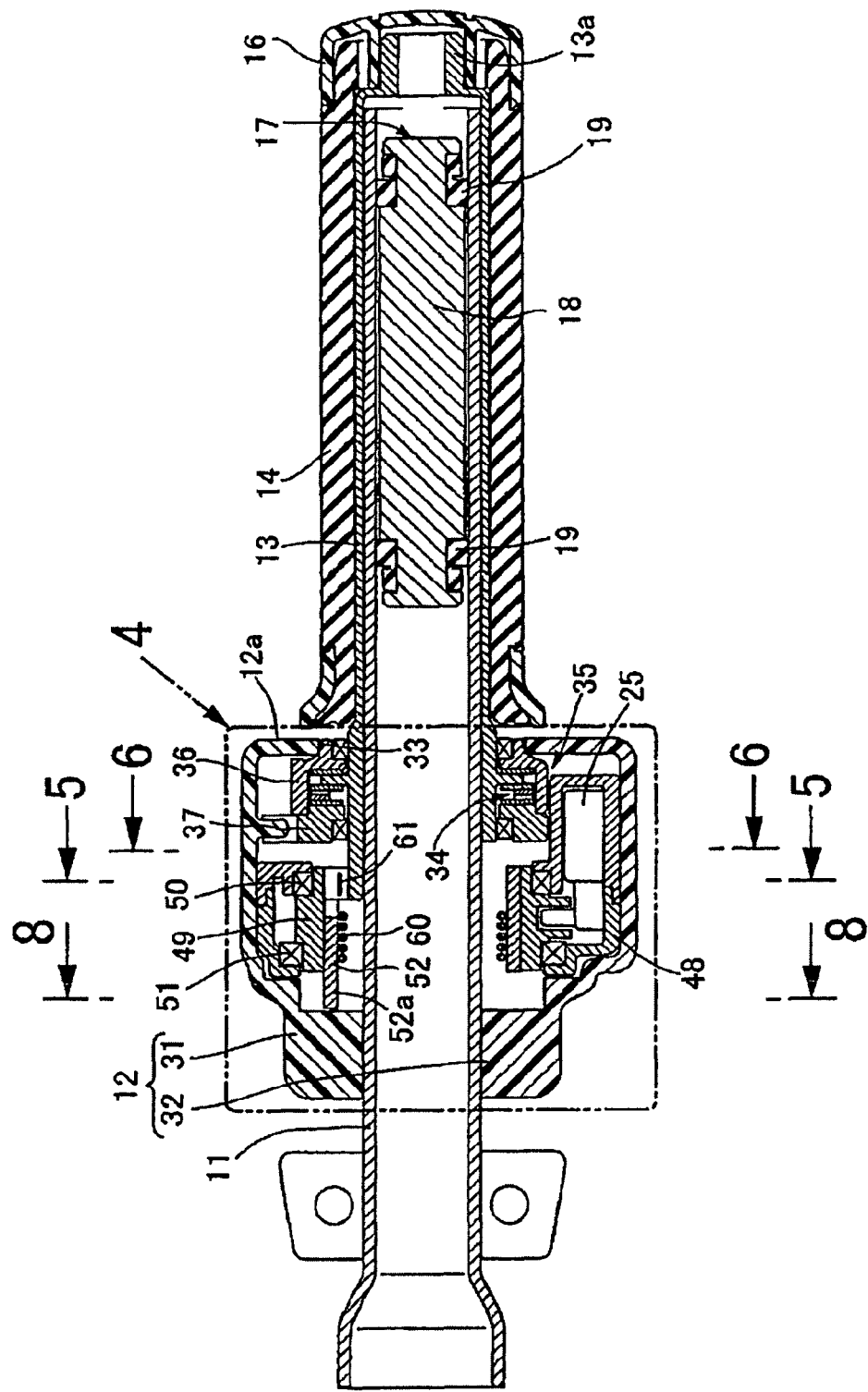
FIG. 2 is a longitudinal sectional view of a right end portion of the bar handle as viewed in a direction same as that in FIG. 1 in accordance with an embodiment of the present invention.

Referring to FIGS. 1 and 2, a case 12 can be fixed to a portion near an outer end (right end) of a bar handle 11 in the form of a pipe provided on a saddle-type vehicle, such as a motorcycle. The motorcycle in this example includes throttle pipe 13 which surrounds the bar handle 11 such that a portion on the inner end side thereof projects into the case 12. Furthermore, the throttle pipe 13 can be supported for rotation and for movement in an axial direction at an outer end portion (right end portion) of the bar handle 11. Further, a throttle grip 14 which covers the throttle pipe 13 is mounted against relative rotation on the throttle pipe 13. Also, in this embodiment, a brake lever 15 is mounted for rotation on the bar handle 11 so it can be rotated by a user's right hand with which the throttle grip 14 is gripped. A supporting tubular portion 13a of a small diameter positioned coaxially outwardly of the outer end of the bar handle 11 is provided coaxially and integrally on an outer end portion of the throttle pipe 13. A cap 16 can be mounted at a right end portion of the supporting tubular portion 13a and the throttle grip 14.

A dynamic damper 17 can be built in the bar handle 11 at a location corresponding to the throttle grip 14. This dynamic damper 17 can include rubber rings 19, 19. These rubber rings 19, 19 are mounted, for example, on outer peripheries of the opposite end portions of a weight 18 of a cylindrical shape inserted in the bar handle 11. Thus, the rubber rings 19, 19 can resiliently be in contact with the inner periphery of the bar handle 11.

Figure 3:
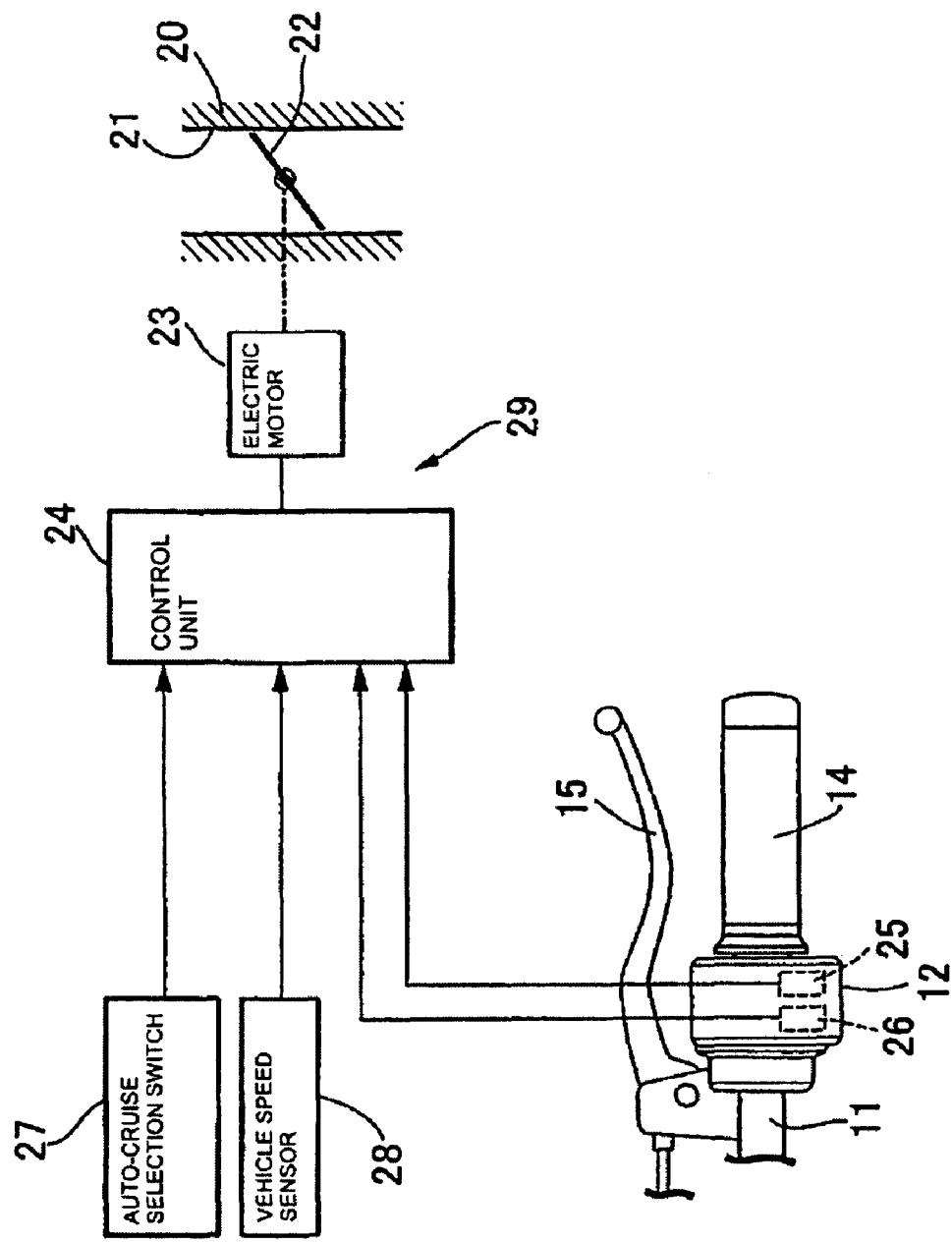
FIG. 3 is a view showing a configuration of a throttle valve control system in accordance with an embodiment of the present invention.

Referring to FIG. 3, a throttle body 20 can be provided in an intake system of an engine of this motorcycle. A throttle valve 22 for controlling the communication area of an intake path 21 provided in the throttle body 20 can be supported for opening and closing movement. An operation of an electric motor 23, which drives throttle valve 22, can be controlled by a control unit 24.

A throttle sensor 25 is disposed at a fixed position in the case 12, and is configured to generate a detection value which indicates a rotating operation amount of the throttle grip 14, and is inputted to the control unit 24. The control unit 24 controls, for example, the electric motor 23 so the opening of the throttle valve 22 has a value that corresponds to the detection value of the throttle sensor 25.

Further, the control unit 24 is configured to receive a signal from an auto-cruise selection switch 27 for changing over between an auto-cruise state and a non-auto-cruise state of the motorcycle and to receive a vehicle speed detected by a vehicle speed sensor 28. When the auto-cruise state is selected by the auto-cruise selection switch 27, the control unit 24 can control operation of the electric motor 23 in order to vary the opening of the throttle valve 22. Thus, the vehicle speed obtained by the vehicle speed sensor 28 upon the changeover operation of the auto-cruise selection switch 27 can be maintained. In particular, the control unit 24, electric motor 23, auto-cruise selection switch 27 and vehicle speed sensor 28 can configure an auto-cruise controlling apparatus 29 for automatically keeping the traveling speed of the motorcycle at a fixed speed. In this embodiment, a cancel switch 26 capable of canceling operation of the auto-cruise controlling apparatus 29 is accommodated in the case 12 in such a manner as to be attached to the case 12.

Figure 4:
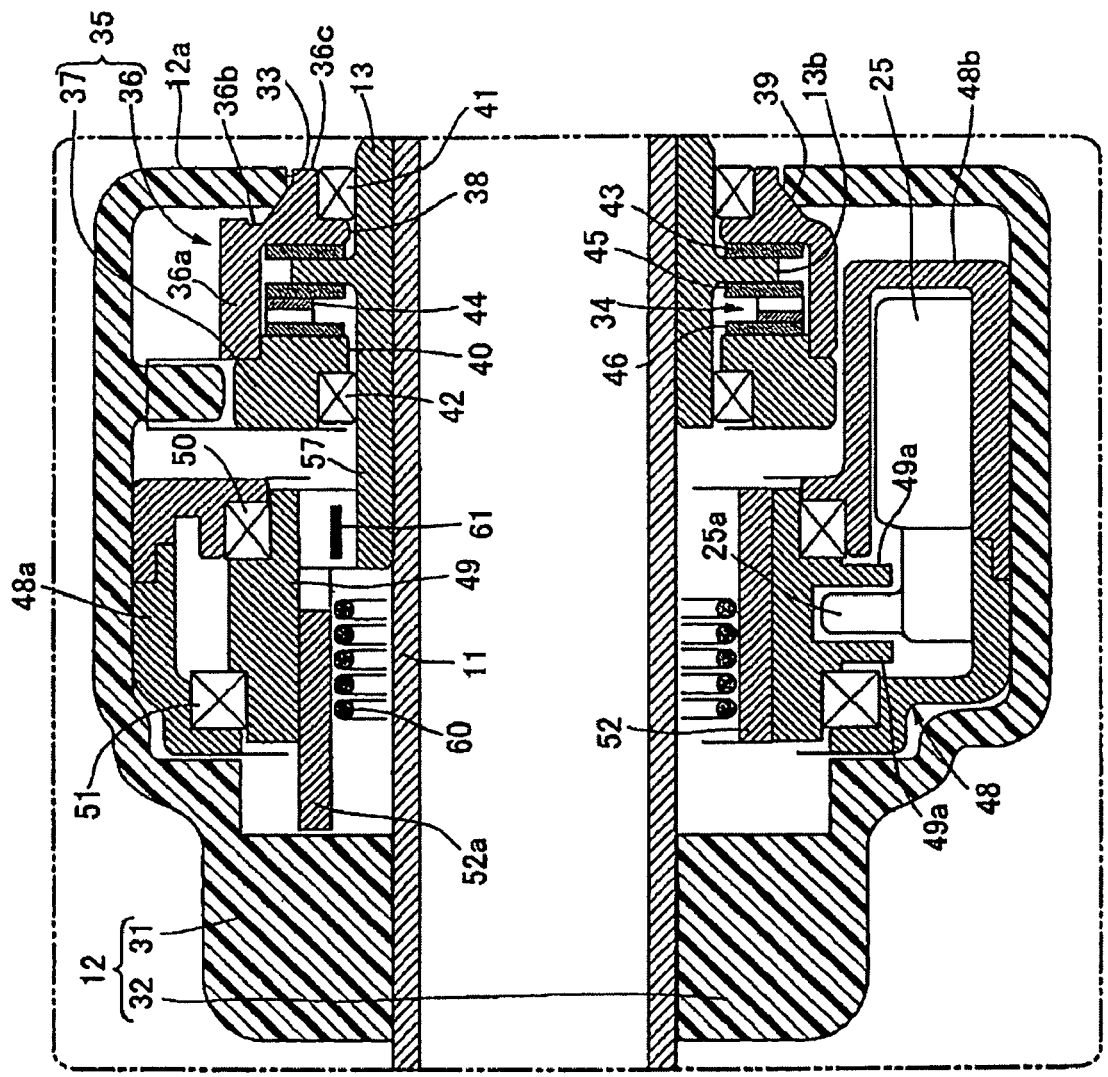
FIG. 4 is an enlarged view of a portion indicated by an arrow mark 4 of FIG. 2 in accordance with an embodiment of the present invention.

Referring also FIG. 4, the case 12 can be configured to couple an upper case half 31 and a lower case half 32 made of a synthetic resin, to each other. The coupling of the upper case half 31 and the lower case half 32 sandwiches the bar handle 11 from above and below. The case can also be fixedly attached to the bar handle 11.

A first fitting hole 33 coaxial with the bar handle 11 and the throttle pipe 13 can be provided in a wall portion 12a opposing to the throttle grip 14 of this case 12, and a portion on the inner end side of the throttle pipe 13 can be projected into the case 12 through the first fitting hole 33.

Incidentally, a resisting force application means or unit 34, which is accommodated in the case 12, can apply a resisting force upon rotating operation of the throttle grip 14. This resisting force application means 34 can be disposed in a housing 35 disposed fixedly in the case 12.

In this embodiment, housing 35 is made of a housing main body 36 and a lid member 37. The lid member 37 can close an opening end of the housing main body 36. The housing main body 36 integrally has a bottomed cylindrical portion 36a which has a end wall 36b adjacent the wall portion 12a of the case 12 and open on the opposite side to the wall portion 12a. A reduced diameter cylindrical portion 36c can coaxially be provided on the end wall 36b so as to connect coaxially to the a second fitting hole 38. The second fitting hole 38 is provided at a central portion of the end wall 36b in such a manner that the throttle pipe 13 is coaxially fitted therein. A tapering face 39 having a diameter gradually increasing toward the end wall 36b side can be formed on an outer periphery of a base portion of the reduced diameter cylindrical portion 36c. Further, the lid member 37 can be coupled to the housing main body 36 in such a manner as to close the open end of the bottomed cylindrical portion 36a of the housing main body 36. Also, in this embodiment, a third fitting hole 40, in which the throttle pipe 13 is fitted coaxially, is provided in the lid member 37.

Since housing 35, as described above, can be fixedly disposed in the case 12, the reduced diameter cylindrical portion 36c thereof is inserted in the first fitting hole 33 and the tapering face 39 is pressed against a circumferential edge portion of an inner end of the first fitting hole 33. An annular first dust seal 41 can be interposed between the reduced diameter cylindrical portion 36c of the housing main body 36 and the throttle pipe 13. An annular second dust seal 42 can be interposed between the lid member 37 and the throttle pipe 13.

In this embodiment, the resisting force application means 34 includes a flange portion 13b. Flange portion 13b is provided on the throttle pipe 13 in the housing 35 and is outwardly projected in a radial direction. The resisting force application means 34 also includes a first washer 43 as a sliding member. The first washer 43 can be sandwiched between the end wall 36b of the housing main body 36 of the housing 35 and one face of the flange portion 13b. A wave washer 44 as a resilient member can be interposed between the lid member 37 of the housing 35 and the flange portion 13b for exerting resilient force to bias the flange portion 13b so as to press the first washer 43 against the end wall 36b of the housing 35. The resisting force application means 34 in this embodiment also includes a second washer 45 interposed between the other face of the flange portion 13b and the wave washer 44 and a third washer 46 interposed between the lid member 37 of the housing 35 and the wave washer 44.

In this embodiment of the resisting force application means 34, the flange portion 13b is biased so as to cooperate with the end wall 36b of the housing 35. This causes the flange portion 13b to sandwich the first washer 43 therebetween by the resilient force exerted by the wave washer 44, and frictional force is generated between the first and second washers 43 and 45 and the flange portion 13b so that rotation load of the throttle pipe 13 and the throttle grip 14 can be generated.

Referring to embodiments of FIGS. 2 and 4, the throttle sensor 25 is accommodated in and fixed to a sensor housing 48 disposed fixedly in the case 12. The sensor housing 48 has a ring portion 48a disposed on the opposite side to the housing 35 along the axial direction of the bar handle 11 in the case 12. The ring portion 48a can coaxially surround the bar handle 11. In this embodiment, a cylindrical portion 48b connects to the ring portion 48a below the bar handle 11 and extends below the housing 35. The throttle sensor 25, as a result, can be accommodated in the cylindrical portion 48b.

A throttle sensor rotor 49 accommodated in the case 12 is supported on the ring portion 48a of the sensor housing 48. This can cause the throttle sensor rotor 49 to have a relative rotation around an axial line coaxially with the throttle pipe 13 and the throttle grip 14. The throttle sensor rotor 49 can be formed to have a circular transverse sectional shape coaxially surrounding the bar handle 11. A pair of annular seal members 50 and 51 are interposed between the opposite end portions of the ring portion 48a and the throttle sensor rotor 49 in the axial direction of the bar handle 11.

At one location of an outer periphery of the throttle sensor rotor 49, a pair of detection object projections 49a, 49a can be provided in a projecting manner so they can extend in a circumferential direction. Projections 49a, 49a can oppose each other in a spaced relationship from each other in the axial direction of the throttle sensor rotor 49. Throttle sensor 25 can be a contactless type magnetic sensor, and includes a detection portion 25a being inserted between the detection object projections 49a, 49a to detect the rotation position of the throttle sensor rotor 49 in a non-contacting state with the throttle sensor rotor 49.

Figure 5:
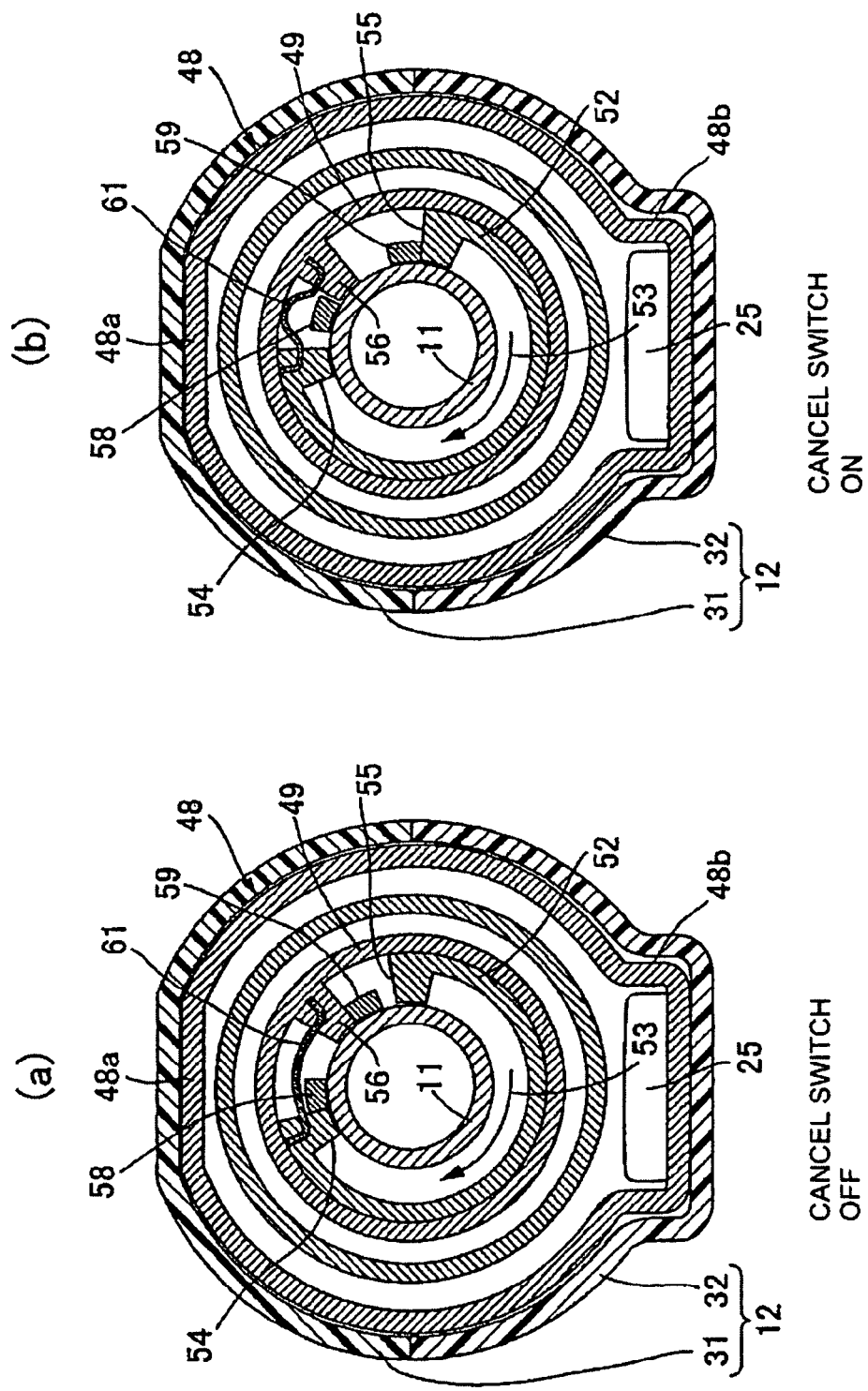
FIG. 5 is enlarged sectional views taken along line 5-5 of FIG. 2 illustrating a cancel switch off state (a) and a cancel switch on state (b) in accordance with an embodiment of the present invention.

Referring also to FIG. 5, a cancel switch rotor 52 accommodated in the case 12 can be fitted with and supported on the throttle sensor rotor 49 for relative rotation around an axial line coaxial with the throttle pipe 13 and the throttle grip 14. The cancel switch rotor 52 is formed to have an arcuate transverse sectional shape such that it can be discontinuous at a portion thereof in a circumferential direction.

At an end portion of the cancel switch rotor 52 adjacent the housing 35, a first stopping projection 54 projecting toward bar handle 11 can be provided. The first stopping projection 54 can integrally be provided at a closing side end portion along a rotation direction 53 to the closing side by the throttle grip 14 and the throttle pipe 13. A second stopping projection 55, which projects toward the bar handle 11, can integrally be provided at an opening side end portion along the rotation direction 53. Further, a third stopping projection 56 disposed between the first and second stopping projections 54 and 55 can integrally be provided in a projecting manner toward the bar handle 11 side at an end portion of the throttle sensor rotor 49 adjacent the housing 35.

Figure 6:
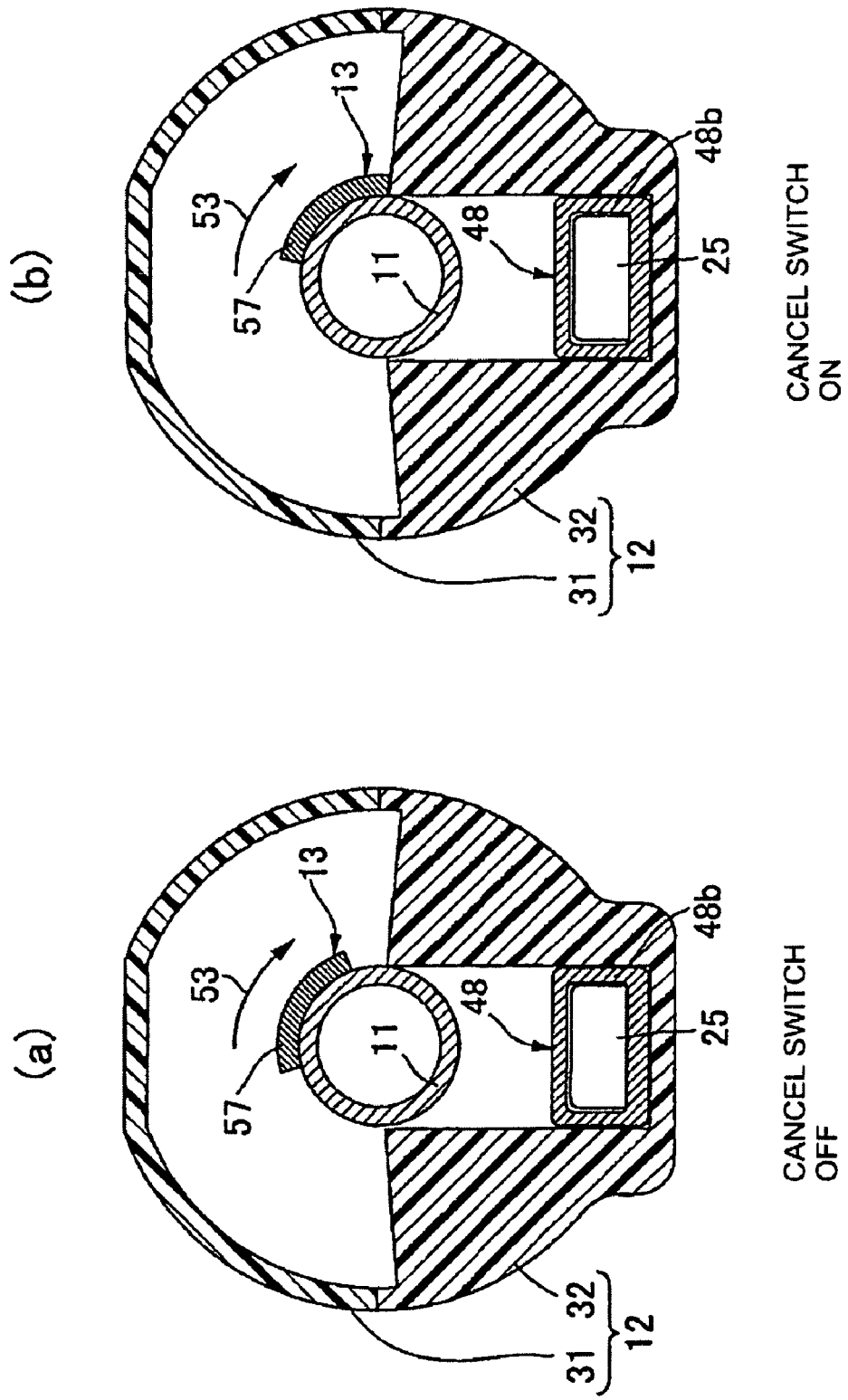
FIG. 6 is enlarged sectional views taken along line 6-6 of FIG. 2 illustrating a cancel switch off state (a) and a cancel switch on state (b) in accordance with an embodiment of the present invention.
Figure 7:
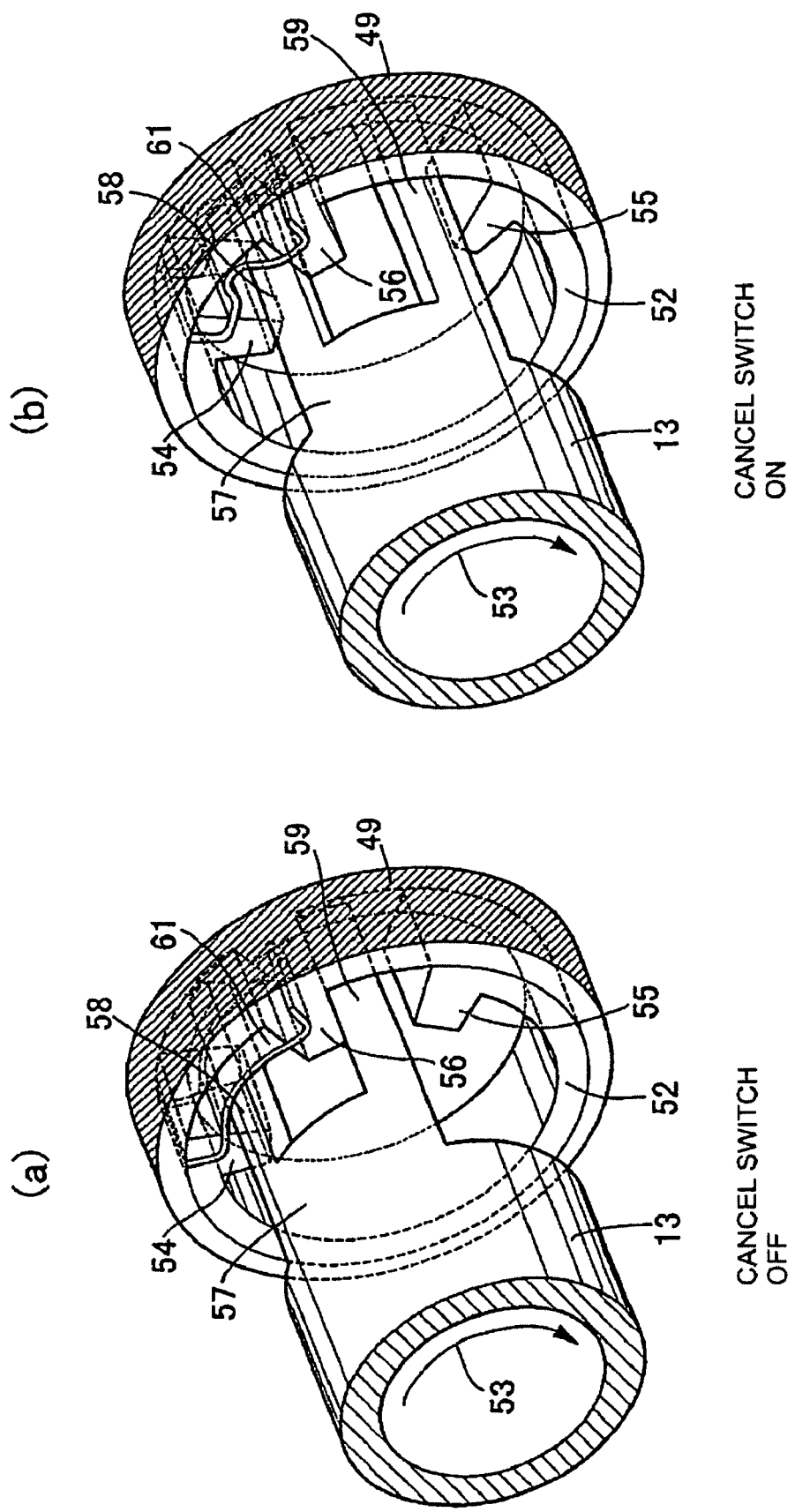
FIG. 7 is perspective views illustrating components in the proximity of an engaging portion of a throttle pipe with a throttle sensor rotor and a cancel switch rotor in a cancel switch off state (a) and a cancel switch on state (b) in accordance with an embodiment of the present invention.

Referring also to FIGS. 6 and 7, a projection 57 extending along an outer periphery of the bar handle 11 can be provided in a projecting manner at one location in a circumferential direction of an inner end of the throttle pipe 13. Projection 57 projects from the housing 35 toward the throttle sensor rotor 49 and the cancel switch rotor 52. A first engaging projection 58 inserted between the first and third stopping projections 54 and 56 and a second engaging projection 59 inserted between the second and third stopping projections 55 and 56 are provided integrally in a projecting manner at the opposite ends in the circumferential direction of the projection 57.

According to this embodiment, a coiled return spring 60 for biasing the cancel switch rotor 52 in the rotation direction 53 to the closing side by the throttle grip 14 and the throttle pipe 13 is provided between the cancel switch rotor 52 and the bar handle 11. When the throttle grip 14 and the throttle pipe 13 are positioned at a rotation position between the fully open position and the fully closed position, the spring force by the return spring 60 can bias the cancel switch rotor 52 with respect to the throttle sensor rotor 49. As a result, the first stopping projection 54 can be abutted with the first engaging projection 58 from the upstream side of the rotation direction 53.

Further, a leaf spring 61 serving as grip repelling operation application means is provided between the first stopping projection 54 and the third stopping projection 56 so it can be deformed in a radial direction of the throttle sensor rotor 49 and the cancel switch rotor 52. When the cancel switch rotor 52 is rotated relative to the throttle sensor rotor 49 such that the first stopping projection 54 approaches the third stopping projection 56, the throttle sensor rotor 49 can be rotated in the closing direction by a spring force exerted by the leaf spring 61. A set load of the leaf spring 61 can be set higher than a set load of the return spring 60. When the leaf spring 61 extends long along a circumferential direction of the cancel switch rotor 52 and the throttle sensor rotor 49 and cannot exert its spring force, and if the first stopping projection 54 is abutted with the first engaging projection 58 from the upstream side of the rotation direction 53 as seen in (a) of FIG. 5 and (a) of FIG. 6, then the third stopping projection 56 can be abutted with the second engaging projection 59 from the upstream side of the rotation direction 53. In this embodiment, the second stopping projection 55 is positioned in a spaced relationship from the second engaging projection 59 along the rotation direction 53.

Accordingly, if the throttle grip 14 and the throttle pipe 13 are rotated to the closing side between the fully open position and the fully closed position, then the cancel switch rotor 52 can rotate to the closing side under the spring force of the return spring 60. Thus, the first stopping projection 54 can be abutted with the first engaging projection 58. Also, if the throttle grip 14 and the throttle pipe 13 are rotated to the closing side between the fully open position and the fully closed position, the throttle sensor rotor 49 can rotate to the closing side through the leaf spring 61. However, if the throttle grip 14 and the throttle pipe 13 are rotated to the opening side between the fully open position and the fully closed position, then the first stopping projection 54 can be pushed by the first engaging projection 58 and the third stopping projection 56 can be pushed by the second engaging projection 59. Thus, the cancel switch rotor 52 and the throttle sensor rotor 49 can follow up to rotate. In particular, the cancel switch rotor 52 and the throttle sensor rotor 49 rotate following up (or in conjunction with) the rotation of the throttle grip 14 and the throttle pipe 13 from the fully open position to the fully closed position. When the throttle grip 14 and the throttle pipe 13 are positioned at the fully closed position, the cancel switch rotor 52 and the throttle sensor rotor 49 can be positioned at a rotation position shown in (a) of FIG. 5 and (a) of FIG. 7. Also, when the throttle grip 14 and the throttle pipe 13 are positioned at the fully closed position, the projection 57 of the throttle pipe 13 is positioned at a rotation position shown in (a) of FIG. 6 and (a) of FIG. 7.

Figure 8:
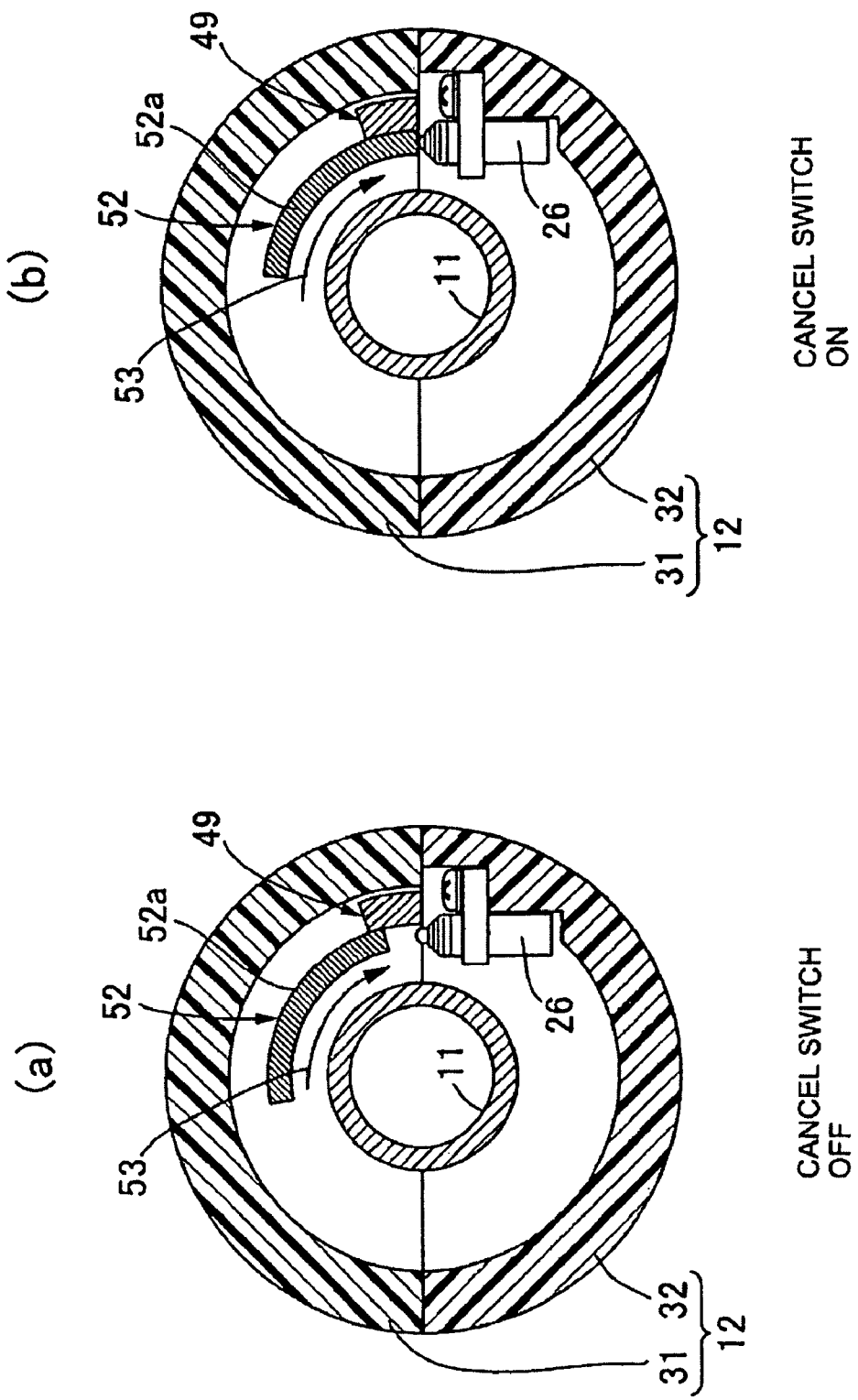
FIG. 8 is an enlarged sectional view taken along line 8-8 of FIG. 2 illustrating a cancel switch off state (a) and a cancel switch on state (b) in accordance with an embodiment of the present invention.

Referring to FIG. 8, a restraining projection 49a can abut with the lower case half 32 of the case 12 as shown in (a) of FIG. 8. When the throttle grip 14 and the throttle sensor rotor 49 are placed into the fully closed position, the restraining projection 49a can integrally be provided at an end portion of the throttle sensor rotor 49 on the opposite side to the housing 35. In this embodiment, the throttle sensor rotor 49 is blocked from rotating following up the rotation of throttle grip 14 and the throttle pipe 13 when they are rotated further from the fully closed position to the closing side by the abutting engagement of the restraining projection 49a with the lower case half 32, as shown in (b) of FIG. 8.

However, when the throttle grip 14 and the throttle pipe 13 are rotated further from the fully closed position to the closing side, since the second stopping projection 55 is pushed by the second engaging projection 59, the cancel switch rotor 52 can be rotated to the closing side as shown in (b) of FIG. 5 and (b) of FIG. 7. By such rotation of the cancel switch rotor 52, the switching mode of the cancel switch 26 can vary.

In particular, as shown in (b) of FIG. 8, an arcuate detection object portion 52a can integrally be provided at an end portion of the cancel switch rotor 52 on the opposite side to the housing 35. The cancel switch 26 can be attached to the lower case half 32 of the case 12. Thus, in response to an operation of the cancel switch rotor 52 following up the rotation of the throttle grip 14 and the throttle pipe 13 from the fully closed position to the closing side, the cancel switch 26 can be pushed by the detection object portion 52a to change the switching mode from an off state to an on state.

When the throttle grip 14 and the throttle pipe 13 are operated to rotate from the fully closed position to the closing side until the switching mode of the cancel switch 26 changes from an off state to an on state, the projection 57 of the throttle pipe 13 can be abutted with the lower case half 32 of the case 12, as shown in (b) of FIG. 6. This can prevent the throttle grip 14 and the throttle pipe 13 from being rotated any more to the closing side.

Further, when the throttle grip 14 and the throttle pipe 13 are rotated from the fully closed position to the closing side, the cancel switch rotor 52 is rotated so that the first stopping projection 54 approaches the third stopping projection 56 of the throttle sensor rotor 49. This third stopping projection 56 can be in a stopping state while the leaf spring 61 is deformed in a radial direction of the throttle sensor rotor 49 and the cancel switch rotor 52, as shown in (b) of FIG. 5. Thereupon, the leaf spring 61 can exert a spring force, which follows up the rotation of the throttle grip 14 and the throttle pipe 13 from the fully closed position to the closing side. The exertion of the spring force can bias the cancel switch rotor 52 to the opposite side to the direction of the operation.

Now, an operation of an embodiment of the present invention will be described below. Cancel switch 26, capable of canceling an operation of the auto-cruise controlling apparatus 29 can be accommodated in the case 12. The case 12 can be secured to the bar handle 11 together with the throttle sensor 25 and the resisting force application means 34 which applies resisting force to the rotating operation of the throttle grip 14. The throttle sensor 25, cancel switch 26 and resisting force application means 34 can also be disposed in a compactly collected state in the case 12. Thus, a countermeasure for the waterproof, oil retention and so forth can be facilitated.

Further, the resisting force application means 34 includes the flange portion 13b. The flange portion 13b can be provided on the throttle pipe 13 supported for movement in an axial direction on the bar handle 11 and can extend outwardly in a radial direction. In this embodiment, the housing 35 is disposed in the case 12 so as to cover the flange portion 13b and be fixed to the case 12. The first washer 43 is sandwiched between one face of the flange portion 13b and the housing 35. The wave washer 44 can be interposed between the housing 35 and the flange portion 13b for exerting resilient force for biasing the flange portion 13b. Thus, the flange portion 13b can press the first washer 43 against the housing 35.

In an embodiment of the present invention, the resisting force application means 34 includes the second washer 45 interposed between the other face of the flange portion 13b and the wave washer 44 and the third washer 46 interposed between the lid member 37 of the housing 35 and the wave washer 44. Therefore, frictional force can be generated at least between the flange portion 13b and the first and second washers 43 and 45. Alternatively, frictional force can be generated between the first washer 43 and the housing 35 by the resilient force exerted by the wave washer 44. As a result, a rotation load of the throttle grip 14 can be generated by the frictional force.

Further, the throttle sensor rotor 49 and the cancel switch rotor 52 which rotate following up rotation of the throttle grip 14 from the fully open position to the fully closed position can be accommodated in the case 12. The rotation position of the throttle sensor rotor 49 can be detected by the throttle sensor 25. This can allow the rotating operation amount of the throttle grip 14 to be detected.

Instead of following up rotation of the throttle sensor rotor 49 when the throttle grip 14 is rotated further from the fully closed position to the closing side is blocked, the cancel switch rotor 52 can rotate following up the rotation of the throttle grip 14 from the fully closed position to the closing side. In response to the rotation of the cancel switch rotor from the fully closed position to the closing side, the cancel switch 26 can change the switching mode from an off state to an on state. Consequently, if a rider operates the throttle grip 14 to rotate to the fully closed position first and then operates the throttle grip 14 to rotate further to the closing side while the vehicle is traveling at a fixed speed by control of the auto-cruise controlling apparatus 29, then the operation of the auto-cruise controlling apparatus 29 can be canceled.

Since the leaf spring 61 is provided between the throttle sensor rotor 49 and the cancel switch rotor 52, the rotating operation of the throttle grip 14 to place the cancel switch 26 into an on state can be carried out against the resilient force of the leaf spring 61. This can result in an operation feeling to be obtained. By releasing the operation force applied to the throttle grip 14 later, the throttle grip 14 can be returned to the fully closed position side.

Further, the leaf spring 61 can be provided between the throttle sensor rotor 49 and the cancel switch rotor 52 in such a manner as to be deformed in a radial direction of the throttle sensor rotor 49 and the cancel switch rotor 52. Thus, by accommodating the leaf spring 61, the case 12 can be prevented from having a large size.

Furthermore, the throttle sensor 25 can be a magnetic sensor of the contactless type which detects the rotation position of the throttle sensor rotor 49 in a non-contacting state with the throttle sensor rotor 49. This can allow the throttle sensor 25 to prevent abrasion from occurring, which can contribute to enhancement of the durability.

Although the embodiment of the present invention is described above, the present invention is not limited to the embodiment described above, but it may be possible to apply various design variations without departing from the present invention described in the claims. For example, also it can also be possible to use a disc spring as a resilient member in place of the wave washer 44 of the resisting force application means 34.

In accordance with one embodiment of the present invention, a saddle-type vehicle can include a throttle sensor. The throttle sensor disposed at a fixed position in a case detects the amount of rotating operation of a throttle grip. The saddle-type vehicle includes a resisting force application means or unit. The resisting force application means applies a resisting force to the rotating operation of the throttle grip. The saddle-type vehicle includes a cancel switch to cancel the operation of an auto-cruise controlling apparatus. The throttle sensor, resisting force application means and cancel switch can be disposed in a compactly collected state.

In accordance with another embodiment of the present invention, a throttle opening detection apparatus provided for a saddle-type vehicle allows a throttle sensor, resisting force application means and a cancel switch to be disposed in a compactly collected state.

In accordance with another embodiment of the present invention, a throttle pipe, which partly projects into a case fixed to a bar handle, supports rotation at an end portion of the bar handle. A throttle sensor detects a rotating operation amount of a throttle grip in response to the rotation of the throttle pipe, which can be disposed at a fixed position in the case. The throttle grip mounted against relative rotation on the throttle pipe covers the throttle pipe. The resisting force application means, which applies a resisting force to the rotating operation of the throttle grip, can be accommodated in the case. The cancel switch, which cancels operation of an auto cruise controlling apparatus that automatically keeps a traveling speed at a fixed speed, can also be accommodated in the case together with the throttle sensor and the resisting force application means.

In accordance with another embodiment of the present invention, the resisting force application means includes a flange portion provided on the throttle pipe, which supports movement in an axial direction on the bar handle, and outwardly projects in a radial direction. A housing disposed in the case covers the flange portion. Also fixed to the case, can be a sliding member sandwiched between the flange portion and the housing. A resilient member interposed between the housing and the flange portion exerts resilient force to bias the flange portion. This may cause the flange portion to press the sliding member against the housing.

In accordance with another embodiment of the present invention, a throttle sensor rotor rotates following up the rotation of the throttle grip from a fully open position to a fully closed position. However, the throttle sensor rotor can be blocked from further rotating following up the rotation of the throttle grip from the fully closed position to the closing side. A cancel switch rotor rotates following up the rotation of the throttle grip from the fully open position to the fully closed position. The cancel switch rotor also rotates following up also the rotation of the throttle grip from the fully closed position to the closing side. The throttle sensor rotor and the cancel switch rotor can be accommodated in the case for relative rotation to the throttle pipe. The throttle grip can be around the coaxial axial line. The throttle sensor can be disposed in the case. This may cause the throttle sensor to detect the rotation position of the throttle sensor rotor. The cancel switch disposed in the case causes a switching mode to change in response to operation of the cancel switch rotor following up the rotation of the throttle grip from the fully closed position to the closing side. The grip repelling operation application means biases the cancel switch rotor to the opposite side to the direction of operation of the cancel switch rotor following up the rotation of the throttle grip from the fully closed position to the closing side is provided between the throttle sensor rotor and the cancel switch rotor.

In accordance with another embodiment of the present invention, the grip repelling operation application means is a leaf spring provided between the throttle sensor rotor and the cancel switch rotor. This can cause the leaf spring to be deformed in a radial direction of the throttle sensor rotor and the cancel switch rotor.

In accordance with another embodiment of the present invention, the throttle sensor is a contactless type magnetic sensor that detects the rotation position of the throttle sensor rotor in a non-contacting relationship with the throttle sensor rotor.

In accordance with another embodiment of the present invention, a first washer 43 corresponds to the sliding member, and a wave washer 44 corresponds to the resilient member.

In accordance with another embodiment of the present invention, since the throttle sensor is disposed at a fixed position in the case fixed to the bar handle, and since the cancel switch and the resisting force application means are accommodated in the case, the throttle sensor, cancel switch and resisting force application means can be disposed in a compactly collected state in the case. Also the case can be facilitated to take a countermeasure for the waterproof, oil retention and so forth.

In accordance with another embodiment of the present invention, frictional force is generated at least between the flange portion of the throttle pile and the washer. Alternatively, frictional force can be generated between the washer and the housing by the resilient force exerted by the resilient member. A rotation load of the throttle grip can also be generated by the frictional force.

In accordance with another embodiment of the present invention, the rotating operation amount of the throttle grip is detected by detecting the rotation position of the throttle sensor rotor. The throttle sensor rotor can rotate following up the rotation of the throttle grip from the fully open position to the fully closed position by the throttle sensor. The cancel switch can vary the switching mode thereof, when the cancel switch rotor rotates following up the rotation of the throttle grip from the fully closed position to the closing side. Thus, if a rider operates the throttle grip to rotate to the fully closed position first and then operates the throttle grip to rotate further to the closing side against the biasing force by the grip repelling operation application means while the vehicle is traveling at a fixed speed by the auto-cruise controlling apparatus, then the operation of the auto-cruise controlling apparatus can be canceled. Thereafter, if the operating force applied to the throttle grip is released, then the throttle grip can be returned to the fully closed position side.

In accordance with another embodiment of the present invention, since the grip repelling operation application means is a leaf spring deformed in a radial direction of the throttle sensor rotor and the cancel switch rotor, the case can be prevented from having a large size by accommodating the grip repelling operation application means.

In accordance with another embodiment of the present invention, since the throttle sensor is a contactless type magnetic sensor, it can prevent abrasion from occurring by detection by the throttle sensor, which can contribute to enhancement of the durability.

DESCRIPTION OF REFERENCE SYMBOLS

11: Bar handle
12: Case
13: Throttle pipe
13b: Flange portion
14: Throttle grip
25: Throttle sensor
26: Cancel switch
34: Resisting force application means (or unit)
35: Housing
43: First washer which is a sliding member
44: Wave washer which is a resilient member
49: Throttle sensor rotor
52: Cancel switch rotor
61: Leaf spring which is grip repelling operation application means (or unit))

We claim:

1. A throttle opening detection apparatus, comprising:
a throttle pipe configured to partly project into a case fixed to a bar handle and configured to support rotation at an end portion of said bar handle;
a throttle sensor configured to detect a rotating operation amount of a throttle grip, which is mounted against relative rotation on said throttle pipe, in response to the rotation of said throttle pipe, wherein said throttle sensor is disposed at a fixed position in said case;
a resisting force application unit configured to apply a resisting force to the rotating operation of said throttle grip, wherein said resisting force application unit is accommodated in said case, a cancel switch configured to cancel operation of an autocruise controlling apparatus, wherein said cancel switch is accommodated in said case together with said throttle sensor and said resisting force application unit, wherein said resisting force application unit further comprises:

a flange portion provided on said throttle pipe, and projecting outwardly in a radial direction;

a housing disposed in said case, and covering said flange portion and fixed to said case;

a sliding member sandwiched between said flange portion and said housing; and a resilient member interposed between said housing and said flange portion, and configured to exert a resilient force to bias said flange portion so as to press said sliding member against said housing.

2. A throttle opening detection apparatus, comprising:

a throttle pipe configured to partly project into a case fixed to a bar handle and configured to support rotation at an end portion of said bar handle;

a throttle sensor configured to detect a rotating operation amount of a throttle grip, which is mounted against relative rotation on said throttle pipe, in response to the rotation of said throttle pipe, wherein said throttle sensor is disposed at a fixed position in said case;

a resisting force application unit configured to apply a resisting force to the rotating operation of said throttle grip, wherein said resisting force application unit is accommodated in said case, a cancel switch configured to cancel operation of an autocruise controlling apparatus, wherein said cancel switch is accommodated in said case together with said throttle sensor and said resisting force application unit;

a throttle sensor rotor configured to rotate following up the rotation of said throttle grip from a fully open position to a fully closed position, wherein said throttle sensor rotor is blocked from further rotating following up the rotation of said throttle grip from the fully closed position to a closing side; and a cancel switch rotor configured to rotate following up the rotation of said throttle grip from the fully open position to the fully closed position, and configured to rotate following up the rotation of said throttle grip from the fully closed position to the closing side, wherein said cancel switch rotor is accommodated in said case for relative rotation around an axial line coaxial with said throttle pipe and said throttle, wherein said throttle sensor is disposed in said case and is further configured to detect the rotation position of said throttle sensor rotor, wherein said cancel switch is disposed in said case and is further configured to change a switching mode in response to operation of said cancel switch rotor following up the rotation of said throttle grip from the fully closed position to the closing side, and a grip repelling operation application unit configured to bias said cancel switch rotor to the opposite side to the direction of operation of said cancel switch rotor following up the rotation of said throttle grip from the fully closed position to the closing side, wherein the grip repelling operation application unit is provided between said throttle sensor rotor and said cancel switch rotor.

3. The throttle opening detection apparatus according to claim 2, wherein said grip repelling operation application comprises a leaf spring provided between said throttle sensor rotor and said cancel switch rotor, and wherein the leaf spring is deformed in a radial direction of said throttle sensor rotor and said cancel switch rotor.

4. The throttle opening detection apparatus according to claim 2, wherein said throttle sensor comprises a contactless type magnetic sensor configured to detect the rotation position of said throttle sensor rotor in a non-contacting relationship with said throttle sensor rotor.

5. A throttle opening detection apparatus, comprising:

a throttle pipe means for supporting rotation at an end portion of a bar handle;

a throttle sensor means for detecting a rotating operation amount of a throttle grip means, in response to a rotation of said throttle pipe means;

a resisting force application means for applying a resisting force to the rotating operation of said throttle grip means;

a cancel switch means for cancelling operation of an autocruise controlling means responsive to the applying of the resisting force to the rotating operation of said throttle grip means; and covering means for housing the cancel switch means, the throttle sensor means, and the resisting force means, wherein said resisting force application means further comprises:

projecting means, provided on said throttle pipe means, for projecting outwardly in a radial direction;

housing means, disposed in said covering means, for covering said projecting means and fixed to said covering means;

a sliding means sandwiched between said projecting means and said housing means; and a resilient means, interposed between said housing means and said projecting means, for exerting a resilient force to bias said projecting means so as to press said sliding means against said housing means.

6. A throttle opening detection apparatus, comprising:

a throttle pipe means for supporting rotation at an end portion of a bar handle;

a throttle sensor means for detecting a rotating operation amount of a throttle grip means, in response to a rotation of said throttle pipe means;

a resisting force application means for applying a resisting force to the rotating operation of said throttle grip means;

a cancel switch means for cancelling operation of an autocruise controlling means responsive to the applying of the resisting force to the rotating operation of said throttle grip means, wherein said resisting force application means further comprises:

a housing means for covering a flange portion means; and a resilient means for exerting a resilient force to bias said flange portion means to press a sliding means against said housing means, wherein said flange portion means is attached to said throttle pipe means and projects outwardly in a radial direction, and wherein said sliding means is sandwiched between said flange means and said housing means.

7. A throttle opening detection apparatus, comprising:

a throttle pipe means for supporting rotation at an end portion of a bar handle;

a throttle sensor means for detecting a rotating operation amount of a throttle grip means, in response to a rotation of said throttle pipe means;

a resisting force application means for applying a resisting force to the rotating operation of said throttle grip means;

a cancel switch means for cancelling operation of an auto-cruise controlling means responsive to the applying of the resisting force to the rotating operation of said throttle grip means;

a throttle sensor rotor means for rotating following up the rotation of said throttle grip means from a fully open position to a fully closed position, wherein the throttle sensor rotor means is blocked from further rotating following up the rotation of said throttle grip means from the fully closed position to a closing side;

a cancel switch rotor means for rotating following up the rotation of said throttle grip means from the fully open position to the fully closed position, and for rotating following up the rotation of said throttle grip means from the fully closed position to the closing side, wherein the cancel switch rotor means is accommodated in said case for relative rotation around an axial line coaxial with said throttle pipe means and said throttle means; and a grip repelling operation application means for biasing said cancel switch rotor means to the opposite side to the direction of operation of said cancel switch rotor means following up the rotation of said throttle grip means from the fully closed position to the closing side, wherein said grip repelling operation application means is provided between said throttle sensor rotor means and said cancel switch rotor means, wherein said throttle sensor means is disposed in said case, and wherein said cancel switch means for changing a switching mode in response to an operation of said cancel switch rotor means following up the rotation of said throttle grip means from the fully closed position to the closing side is disposed in said case.

8. The throttle opening detection apparatus according to claim 7, wherein said grip repelling operation application means comprises a leaf spring means provided between said throttle sensor rotor and said cancel switch rotor, and wherein the leaf spring means is deformed in a radial direction of said throttle sensor rotor means and said cancel switch rotor means.

9. The throttle opening detection apparatus according to claim 7, wherein said throttle sensor means comprises a contactless type magnetic sensor means for detecting the rotation position of said throttle sensor rotor means in a non-contacting relationship with said throttle sensor rotor means.

10. A throttle opening detection method for a saddle-type vehicle, comprising:

detecting, by a throttle sensor, a rotating operation amount of a throttle grip, in response to a rotation of a throttle pipe;

applying, by a resisting force application unit, a resisting force to the rotating operation of said throttle grip; and cancelling, by a cancel switch accommodated in a case together with the throttle sensor and the resisting force application unit, an operation of an auto-cruise controlling apparatus responsive to the resisting force being applied to the rotating operation of said throttle grip, wherein said applying of the resisting force by the resisting force application unit further comprises:

providing a flange portion on said throttle pipe, the flange portion projecting outwardly in a radial direction;

disposing a housing in said case;

covering, by the housing, said flange portion, wherein the housing is fixed to said case;

sandwiching a sliding member between said flange portion and said housing; and interposing a resilient member between said housing and said flange portion; and exerting, by the resilient member, a resilient force to bias said flange portion so as to press said sliding member against said housing.

11. The throttle opening detection method according to claim 10, further comprising:

exerting, by a resilient member, a resilient force to bias a flange portion to press a sliding member against a housing.

12. The throttle opening detection method according to claim 11, wherein the exerting comprises exerting the resilient force to bias said flange portion being attached to said throttle pipe and projecting outwardly in a radial direction.

13. The throttle opening detection method according to claim 11, wherein the exerting comprises exerting the resilient force on said sliding member against said housing, wherein said housing is disposed in said case to cover said flange portion and being fixed to said case.

14. The throttle opening detection method according to claim 11, wherein the exerting comprises exerting the resilient force on said sliding member, wherein said sliding member is sandwiched between said flange portion and said housing.

15. A throttle opening detection method for a saddle-type vehicle, comprising:

detecting, by a throttle sensor, a rotating operation amount of a throttle grip, in response to a rotation of a throttle pipe;

applying, by a resisting force application unit, a resisting force to the rotating operation of said throttle grip;

cancelling, by a cancel switch, an operation of an auto-cruise controlling apparatus responsive to the resisting force being applied to the rotating operation of said throttle grip;

rotating, by a throttle sensor rotor, following up the rotation of said throttle grip from a fully open position to a fully closed position;

blocking the throttle sensor rotor from further rotating following up the rotation of said throttle grip from the fully closed position to a closing side;

rotating, by a cancel switch rotor, following up the rotation of said throttle grip from the fully open position to the fully closed position;

rotating, by said cancel switch rotor, following up the rotation of said throttle grip from the fully closed position to the closing side;

relatively rotating said cancel switch rotor accommodated in said case around an axial line coaxial with said throttle pipe and said throttle;

detecting, by said throttle sensor, the rotation position of said throttle sensor rotor;

changing, by said cancel switch, a switching mode in response to operation of said cancel switch rotor following up the rotation of said throttle grip from the fully closed position to the closing side; and biasing, by a grip repelling operation application unit, said cancel switch rotor to the opposite side to the direction of operation of said cancel switch rotor following up the rotation of said throttle grip from the fully closed position to the closing side, wherein the grip repelling operation application unit is provided between said throttle sensor rotor and said cancel switch rotor.

16. The throttle opening detection method according to claim 15, wherein said biasing comprises biasing by a leaf spring provided between said throttle sensor rotor and said cancel switch rotor, the leaf spring being deformed in a radial direction of said throttle sensor rotor and said cancel switch rotor.

17. The throttle opening detection method according to claim 15, further comprising:
    detecting, by said throttle sensor, the rotation position of said throttle sensor rotor in a non-contacting relationship with said throttle sensor rotor.

* * * * *